Jan. 12, 1965  A. E. RATHBUN  3,165,308

SPRING SEAT SUSPENSION

Filed June 11, 1963

INVENTOR.
ALAN E. RATHBUN

BY *Hamilton & Cook*

ATTORNEYS

United States Patent Office 3,165,308
Patented Jan. 12, 1965

3,165,308
SPRING SEAT SUSPENSION
Alan E. Rathbun, 3135 Highland Drive,
Cuyahoga Falls, Ohio
Filed June 11, 1963, Ser. No. 287,077
4 Claims. (Cl. 267—111)

The invention relates generally to spring seat supports for chairs and similar articles of furniture, including automobile and vehicle transportation seats.

More particularly, the invention relates to an inexpensive spring seat suspension which provides a comfortable seat with a minimum of side sway, and which is easily adapted to a variety of seats subjected to a wide range of conditions.

Various prior spring seat constructions of which I am aware utilize many different types of springs, including coil springs and helical springs combined with interlaced webbing, but to change the amount of deflection to suit requirements involves changing a plurality of the springs. Moreover, with such springs, a relatively soft seat having substantial deflection also allows side sway or lateral pitching of the person sitting thereon when the seat is on a vehicle in motion. The condition is very undesirable in transportation seating.

The object of the present invention is to provide an improved spring seat suspension which is simple in constructon and embodies a minimum number of spring elements which are quickly and easily changed to suit varying conditions.

Another object is to provide a simple and inexpensive spring seat suspension which provides a firmly comfortable seat with a minimum amount of side sway.

These and other objects are accomplished by the constructions, parts and arrangements comprising the present invention, preferred embodiments of which are shown by way of example in the accompanying drawings and described in detail herein. Various modifications are embodied within the scope of the appended claims.

Referring to the drawings.

Figure 1:
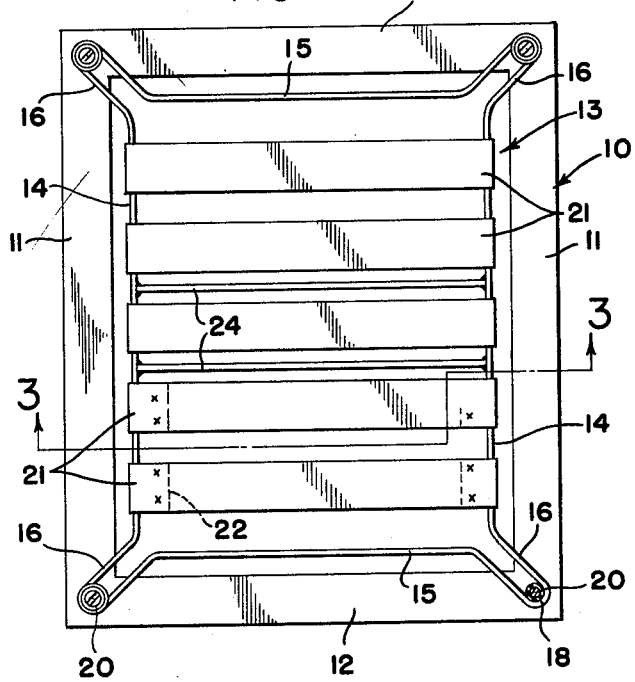
FIG. 1 is a plan view of the improved spring seat suspension mounted on a rigid frame.

The improved spring seat suspension comprises straps or webbing carried on a resilient substantially rigid spring rod frame supported at the corners to allow some bodily deflection of the spring frame within a rigid supporting frame, there being at least one transverse bowed spring rod under compression with at least one end abutting the spring rod frame to yieldingly resist lateral movement of said spring rod frame in response to a load on said webbing.

A rigid frame of wood or metal is indicated generally at 10, and may have opposing side members 11 and end members 12. The frame 10 may be supported on the seat of a chair, as indicated in phantom in FIG. 3, or may be part of a transportation or other seat support.

The improved spring seat suspension is indicated generally at 13, and has a resilient rod frame along its margin. This resilient rod frame may be rectangular, as shown, having two opposing side members 14 and two opposing end members 15. However, the configuration of the resilient rod frame may vary, as well as the number of sides, as long as at least one marginal side frame member is provided.

The rectangular frame 14, 15 shown is made of one piece of rod, and preferably has diagonally extending loops 16 at the corners for supporting the suspension on the corners of the rigid frame 10. As shown, each loop 16 may be received in the annular groove 17 of a rubber grommet 18 mounted on the frame 10 by a bolt 20. Thus the side and end members 14 and 15 are resiliently suspended within the frame 10 by the loops 16.

Laterally spaced straps 21 are fastened at their ends to the side rod portions 14. The straps can be of any suitable material and are preferably of strip metal, such as tempered steel, having their ends wrapped around the rods and the overlapping portions 22 of the straps secured together, as by spot welding, as indicated in the drawings. Obviously, the straps may be crossed or interlaced if desired.

Figure 2:
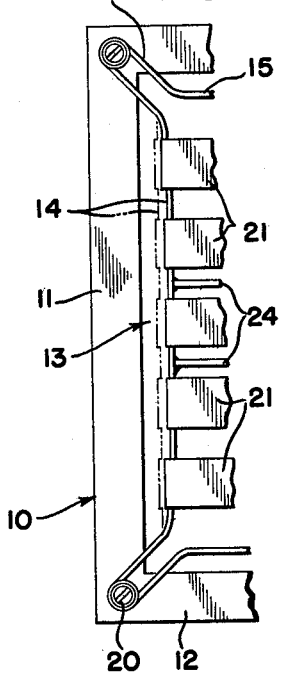
FIG. 2 is a partial plan view indicating in solid lines the lateral deflection of the suspension under load.

Between at least one pair of the straps 21 a bowed spring rod compression member 24 is provided with its ends abutting the frame rods 14, the length of said rod 24 being such that it is bowed and held under compression between the opposed side rods 14. Several of these rods may be provided, two being shown in FIGS. 1 and 2. Obviously, the rods may be directly under the straps with the ends of the rods inserted through slots in the straps.

The ends of spring rods 24 may be fitted in grooves in the side rods 14 or may be welded thereto, as indicated in the drawings. The diameters of the spring rods 24 and the frame rods 14, 15 may vary according to requirements. For example, in a single seat suspension operating under average loads, the frame rods 14, 15 may be of 3/16" to 3/8" diameter and the spring rods may be 1/4" to 3/8" diameter.

Figure 3:
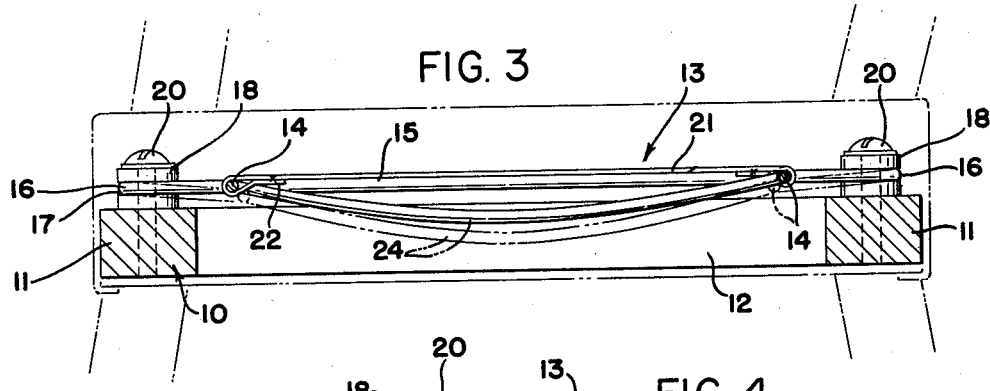
FIG. 3 is an enlarged cross sectional view on line 3—3 of FIG. 1 showing the deflected position under load in phantom lines.
Figure 4:
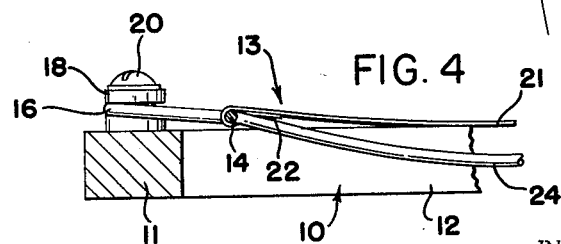
FIG. 4 is a partial cross section showing the deflected position in full lines.
Figure 5:
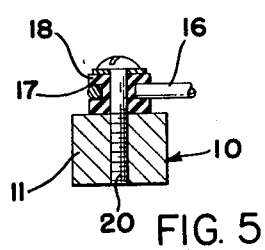
FIG. 5 is a partial section of the corner support.

As best indicated in FIGS. 3 and 4, the extension loops 16 provide for suspending the spring frame members 14 and 15 entirely within the seat frame 10, so that when a seating load is applied to the straps the whole suspension can resiliently deflect bodily slightly downwardly within the seat frame, as indicated in phantom lines, without substantial or material lateral deflection. This bodily resiliency is augmented by the rubber grommets 18.

The transverse bowed spring rods 24 provide controlled yielding movement of the side rod portions 14 toward each other, resulting in a slight sagging of the straps 21 under load. Thus, a firmly comfortable spring seat suspension, with a minimum amount of side sway, is provided, and the suspension can easily be varied or adjusted to a great variety of conditions merely by changing the diameter or length of the spring rods 24, or both. The improved construction requires a minimum number of elements and is extremely simple and inexpensive to construct.

What is claimed is:

1. Spring seat suspension comprising, a rigid seat frame, a resilient rod spring frame within said seat frame, a plurality of laterally spaced straps attached at their ends to said spring frame, a means supporting said spring frame member on said seat frame for limited downward yielding movement under load on said straps, and a bowed spring rod under compression having its ends abutting opposite sides of said spring frame for regulating transverse flexure of said resilient rod spring frame.

2. Spring seat suspension comprising, a rectangular rigid seat frame, a resilient rod rectangular spring frame within said seat frame, a plurality of laterally spaced straps attached at their ends to opposite sides of said spring frame, said spring frame having extension loops at the corners, means yieldingly mounting said loops on said seat frame for limited yielding movement bodily under load on said straps, and a bowed spring rod under compression having its ends abutting opposite sides of said frame.

3. Spring seat suspension comprising, a rectangular rigid seat frame, a resilient rod rectangular spring frame within said seat frame, a plurality of laterally spaced straps attached at their ends to opposite sides of said spring frame, integral loops in the corners of said spring frame extending diagonally outwardly, resilient grommets mounted on the corners of said rigid seat frame and yieldingly supporting said loops of said spring frame when a load is applied to said laterally spaced straps, and a bowed spring rod under compression having its ends abutting opposite sides of said spring frame for controlling transverse flexure of said spring frame.

4. A spring seat suspension comprising, a rigid seat frame, a resilient rod spring frame positioned within said seat frame sufficiently to permit a bodily vertical deflection thereof, extension loops extending outwardly of said spring frame and connecting said spring frame to said seat frame to permit said bodily vertical movement, strap means having ends connected to said spring frame, and a bowed spring rod under compression having ends abutting opposite sides of said spring frame for regulating transverse flexure of said spring frame.

References Cited in the file of this patent
UNITED STATES PATENTS

| | | |
|---|---|---|
| 1,189,951 | Hurd et al. | July 4, 1916 |
| 1,302,536 | Goldstein | May 6, 1919 |
| 1,738,831 | Kean | Dec. 10, 1929 |
| 2,371,954 | Cunningham | Mar. 20, 1945 |

UNITED STATES PATENT OFFICE
CERTIFICATE OF CORRECTION

Patent No. 3,165,308                        January 12, 1965

Alan E. Rathbun

It is hereby certified that error appears in the above numbered patent requiring correction and that the said Letters Patent should read as corrected below.

Column 1, line 24, for "The" read -- This --; column 2, line 59, strike out "a"; column 3, line 3, after "said" insert -- spring --.

Signed and sealed this 18th day of May 1965.

(SEAL)
Attest:

ERNEST W. SWIDER                              EDWARD J. BRENNER
Attesting Officer                                  Commissioner of Patents